(12) United States Patent
Kyker et al.

(10) Patent No.: US 6,578,138 B1
(45) Date of Patent: Jun. 10, 2003

(54) SYSTEM AND METHOD FOR UNROLLING LOOPS IN A TRACE CACHE

(75) Inventors: Alan Beecher Kyker, Portland, OR (US); Robert Franklin Krick, Fort Collins, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/475,061

(22) Filed: Dec. 30, 1999

(51) Int. Cl.[7] ................................................. G06F 9/40
(52) U.S. Cl. ........................ 712/241; 711/118; 712/215
(58) Field of Search ............................... 712/214, 241, 712/215; 711/118

(56) References Cited

U.S. PATENT DOCUMENTS

| | | | |
|---|---|---|---|
| 5,381,533 A | 1/1995 | Peleg et al. | 712/215 |
| 6,018,786 A | 1/2000 | Krick et al. | 711/4 |
| 6,076,144 A | * 6/2000 | Peled et al. | 711/125 |
| 6,170,038 B1 | 1/2001 | Krick et al. | 711/125 |

OTHER PUBLICATIONS

Vajapeyam S et al.: *Improving Superscalar Instruction Dispatch and Issue by Exploiting Dynamic Code Sequences*, Denver, Jun. 2–4 1997, New York, ACM, US, vol. Conf. 24, Jun. 2, 1997, pp. 1–12

* cited by examiner

*Primary Examiner*—Kenneth S. Kim
(74) *Attorney, Agent, or Firm*—Kenyon & Kenyon

(57) ABSTRACT

An exemplary processor or trace cache according to the present invention includes a cache unit, which includes a data array that stores traces. The processor or trace cache also includes a control block connected to the cache unit, the control block unrolling loops when building the traces. In one exemplary method of unrolling loops, the processor or trace cache unrolls loops until the trace is a minimum length. In another exemplary embodiment, the processor or trace cache unrolls only those loops in which the head of the loop is the trace head. In a third exemplary embodiment, the processor or trace cache unrolls loops based on a predicted number of iterations of the loop when executed.

22 Claims, 11 Drawing Sheets

SYSTEM AND METHOD FOR UNROLLING LOOPS IN A TRACE CACHE

FIELD OF THE INVENTION

The present invention relates to computer processors. In particular, the present invention relates to the storage of loops within a trace cache of a processor.

BACKGROUND INFORMATION

In a computer system, a cache stores data in order to decrease data retrieval times for a processor. More particularly, a cache stores specific subsets of data in high-speed memory. When a processor requests a piece of data, the system checks the cache first to see if the data is stored within the cache. If it is available, the processor can retrieve the data much faster than if the data was stored in other computer readable media such as random access memory, a hard drive, CD ROM or floppy disk.

One particular type of cache is referred to as a trace cache. A trace cache is responsible for building, caching, and delivering instruction traces to a processor. In one type of trace cache, instructions are stored as "traces" of decoded micro-operations or "micro-ops", and are only allowed to be accessed in units of "traces." Traces are blocks of micro-op instructions that are distinguishable from one another only by their trace heads.

Traces often contain backward taken branches. A backward taken branch generally occurs when the target address of a branch is a prior micro-op, and in particular, for purposes of this description, a prior micro-op of the trace. In this case, the target address, the backward taken branch, and any micro-ops between the two form a loop. For example, a trace may be built containing three micro-ops, which together form a loop. The first micro-op (the trace head) may be the head of the loop, while the second micro-op is the second micro-op of the loop. In this example, the third micro-op of the trace contains a backward taken branch whose target address is the first micro-op of the trace (i.e. the trace head, in this case also the head of the loop). In a conventional trace cache, the building of the trace may stop at this point, so that the three-micro-op loop comprises the entire trace.

When executed, the loop may be repeated many consecutive times. Accordingly, the exemplary trace will be sent to the processor many consecutive times. Generally traces are constructed so that, wherever possible, each trace line contains the maximum number of micro-ops allowed by the cache structure, for example six micro-ops. In this manner, the trace cache can supply to the processor up to six micro-ops per clock cycle. The trace cache in this case, however, will supply at most three micro-ops per clock cycle, even though the trace cache may store up to six micro-ops per trace line. This shortfall occurs because the trace itself contains only three micro-ops. Moreover, the backward taken branch occurs in this example at the first line of the trace, which may decrease bandwidth even further. Many branch prediction or targeting schemes require a minimum of two clock cycles to determine the target of a branch, so that in this case a clock cycle will be wasted while the trace cache determines the target of the third micro-op.

SUMMARY OF THE INVENTION

An exemplary processor or trace cache according to the present invention includes a cache unit, which includes a data array that stores traces. The processor or trace cache also includes a control block connected to the cache unit, the control block unrolling loops when building the traces.

DETAILED DESCRIPTION

A trace cache according to the present invention "unrolls" loops according to several exemplary embodiments in order to achieve higher bandwidth between the trace cache and the processor. While this description generally refers to the trace cache and the processor as two separate elements, it should be understood that this reference is for convenience only, and that the description should be read to include embodiments where the trace cache is integral with or otherwise part of a processor. It should also be understood that in this description each trace line contains, for example, up to six micro-ops, but that each trace line may be capable of containing any number of micro-ops. While the specific numbers related to the exemplary embodiments will then vary, the principles of the invention are unaffected, by specific trace cache sizes and arrangements. Finally, when describing the exemplary methods according to the present invention, the description generally indicates that the "trace cache" may perform certain functions. In the exemplary embodiment of the trace cache itself, however, specific components may perform some of these functions. The term "trace cache" is generally used in the method description to indicate that in other embodiments of a trace cache according to the present invention, other elements may perform the described steps.

Figure 1:
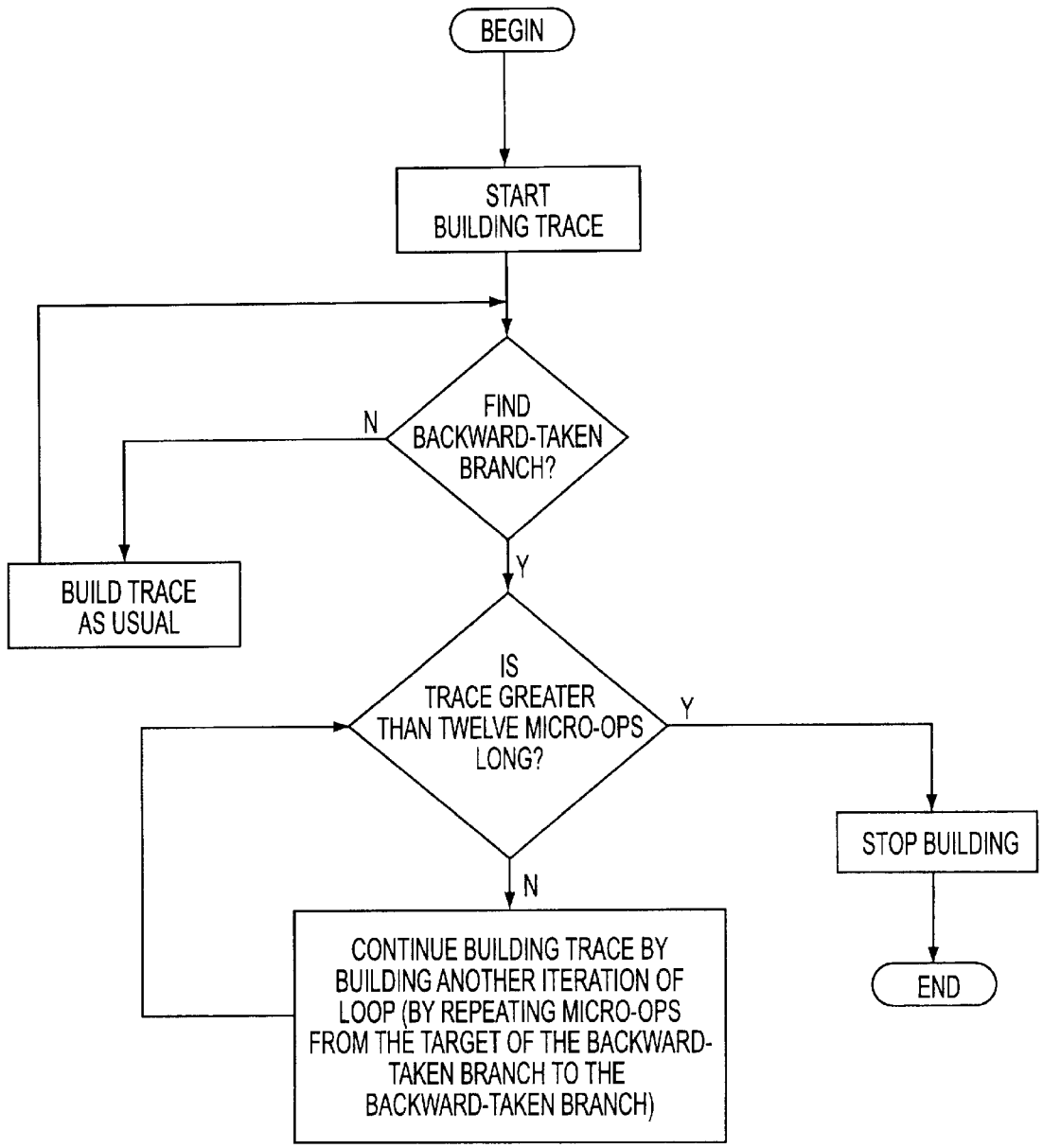
FIG. 1 is a flow chart of a first exemplary embodiment of a method according to the present invention.
Figure 2:
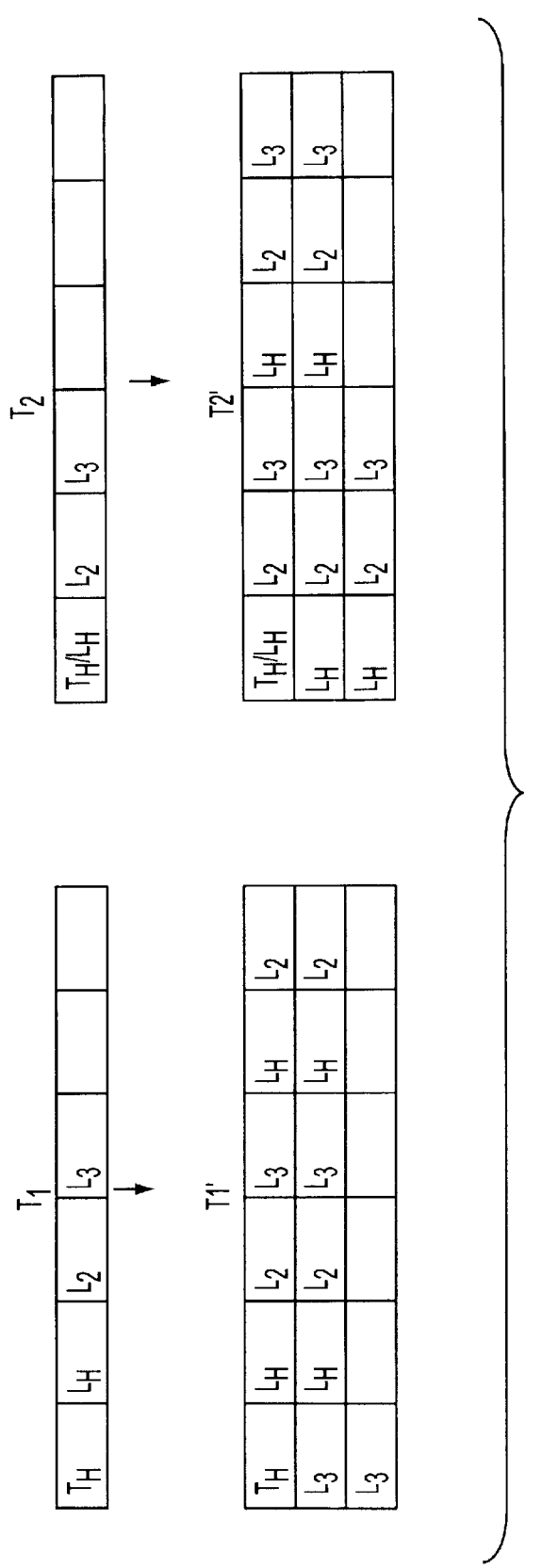
FIG. 2 is a schematic drawing of the application of the method of FIG. 1 to two exemplary traces.

FIGS. 1 and 2 illustrates an exemplary embodiment of a method of unrolling loops within a trace cache according to the present invention. In particular, this first exemplary method is applied to two exemplary traces T1 and T2 (illustrated in FIG. 2), which will be utilized throughout the description for convenience. Traces T1 and T2 represent traces built according to known methods described above, and will be contrasted with traces T1' and T2', which are built according to exemplary embodiments of methods according to the present invention. Exemplary trace T1 includes a total of four micro-ops, three of which form a loop. Trace T1 first includes a trace head $T_H$, followed by the head of the loop $L_H$. The third micro-op of trace T1 is the second micro-op of the loop, $L_2$, and the fourth micro-op of the trace is the third micro-op of the loop, $L_3$. The final micro-op $L_3$ includes, for example, the backward taken branch whose target address is the head of the loop $L_H$. The second exemplary trace T2 includes the same loop, $L_H$, $L_1$, $L_2$, but does not include any micro-op preceding the loop itself. Accordingly, $L_H$ is also the trace head (and is therefore illustrated as $T_H/L_H$), followed by $L_2$ and $L_3$ (see FIG. 2).

In the first exemplary method, the trace cache does not end the current trace (i.e. the trace being built) at the occurrence of the backward taken branch, as may be done in a conventional trace cache. Rather, when the trace cache determines that a loop is present, the trace cache continues to build the trace by building additional iterations of the loop until the trace is a minimal length, for example until the trace is greater than twelve micro-ops long. In other words, the trace cache builds the loop repeatedly until the trace is, for example, over two trace lines long. In an exemplary embodiment, the existence of a loop is established by checking for the existence of a backward-taken branch. It should be understood, however, that the determination that a loop exists need not be an active determination. Rather, the phrasing is simply used to designate a general situation in which a loop exists. If no loop exists for a given micro-op, the trace cache may continue to build the trace as usual, i.e., according to given parameters and limitations (such as length, etc.) which may be incorporated in a trace cache which does not unroll loops according to the present invention.

After two trace lines have been filled, the trace continues to build the trace only until the micro-op $L_3$—the micro-op containing the backward taken branch—is encountered once more. For the exemplary trace T1', this occurs at the first micro-op of the third trace line, while for trace T2' this occurs at the third micro-op of the third trace line, as illustrated in FIG. 2. During the build process, the backward taken branches of any intermediate (i.e. non-final) $L_3$ micro-ops can be eliminated or otherwise suppressed, so that no branching occurs until the final micro-op of the trace is executed. It should be understood that the "two trace line" and "twelve micro-op" limitations are exemplary.

Unrolling loops according to the first exemplary method tends to increase bandwidth when the trace is ultimately read to the processor, particularly when the loop is repeated multiple times. As noted above, an exemplary trace cache according to the present invention, supplies up to six micro-ops to a processor per clock cycle (i.e., one horizontal row in FIG. 2 per clock cycle). Looking for example at trace T2', it can be seen that the trace will supply, for example, an average of five micro-ops per clock cycle to the processor, six micro-ops for the first and second clock cycles and three micro-ops for the third clock cycle. Moreover, because the trace itself is at least two micro-ops long, the target of the last micro-op $L_3$ (the target being the trace head) will be immediately available. Thus no clock cycles are wasted.

Figure 3:
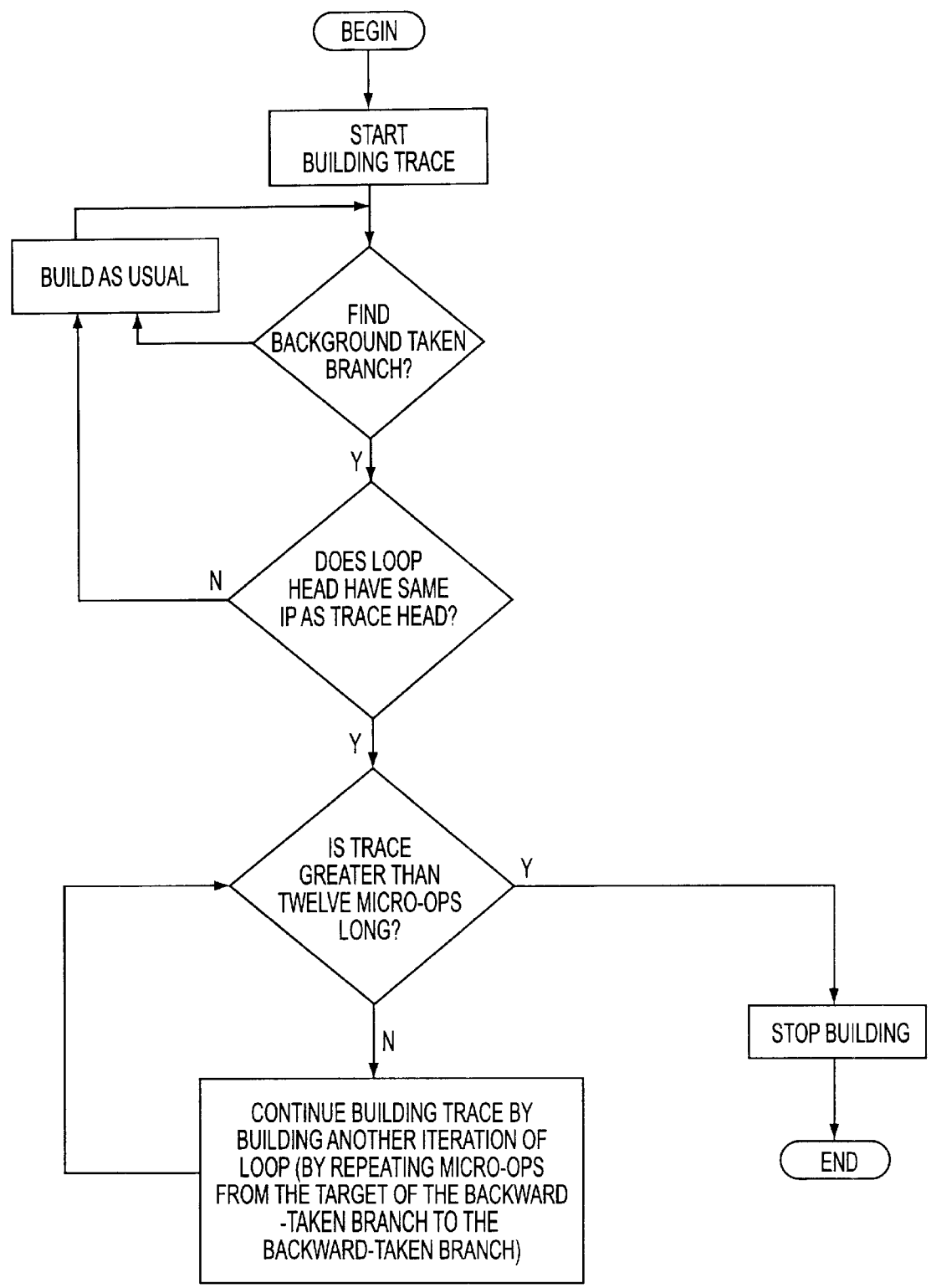
FIG. 3 is a flow chart of a second exemplary embodiment of a method according to the present invention.
Figure 4:
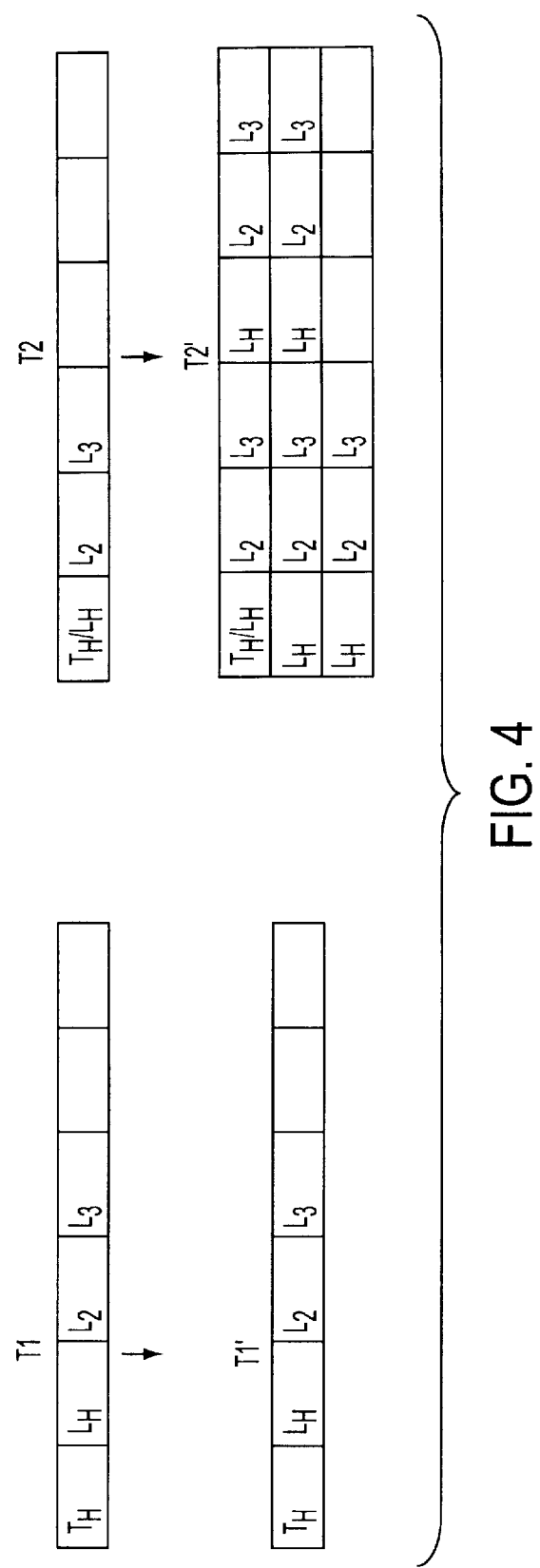
FIG. 4 is a schematic drawing of the application of the method of FIG. 3 to the two exemplary traces.

FIGS. 3 and 4 illustrate a second exemplary embodiment of a method according to the present invention. This second exemplary embodiment provides similar advantages to the first exemplary embodiment, but does so at less average cost to cache hit rate. One outcome of unrolling loops is that the loop occupies more space within the trace cache than if it were not unrolled, meaning that fewer traces may be stored in the trace cache. The cache hit rate therefore tends to decrease. Normally this drawback is outweighed by the bandwidth improvement provided by unrolling. In certain situations, however, it is especially advantageous not to unroll certain loops. For example, looking at trace T1' of FIG. 2, it can be understood that this trace cannot be read to the processor numerous times to perform consecutive executions of the loop because the trace contains an "extra" micro-op, the trace head $T_H$. Accordingly, either the trace must build an additional trace containing only the loop itself, or the loop must be read directly from memory or from another cache. In this situation, unrolling the loop provides much less advantage because the additional copies of the loop cannot be read repeatedly. At the same time, the additional copies take up space within the trace cache, reducing the hit rate.

In exemplary method illustrated in FIGS. 3 and 4, a check is performed to minimize any unnecessary unrolling. In this embodiment, when the trace cache encounters a backward taken branch while building a trace, the trace cache determines whether the target of the backward taken branch (the head of the loop) has the same instruction pointer as the head of the trace. In other words, the trace cache determines whether the head of the loop is the trace head. Only if this condition is satisfied does the trace cache unroll the loop. If the loop is unrolled, it may be done, for example, according to the first exemplary method described above or according to some other method. The exemplary condition ensures that the trace contains no micro-ops preceding the head of the loop, so that the trace may be read repeatedly to the processor when the loop is executed.

Application of the second exemplary method is illustrated in FIG. 4. As can be seen, trace T1' is identical to trace T1. Because the target of the backward taken branch ($L_H$) has a different instruction pointer than the trace head ($T_H$), the trace cache does not unroll the loop. Instead, the trace cache may build, for example, an additional trace if suitable, or the loop can be read from another cache or from other memory when executed. Regardless of the actual method of execution, the lack of unrolling in trace T1' conserves space within the trace cache, increasing the number of stored traces and hence the hit rate. In trace T2', the target $L_H$ does have the same instruction pointer as the trace head $T_H$, so the loop is unrolled, for example according to the exemplary method of FIG. 1. When the loop is executed, trace T2' may be read to the processor repeatedly.

Figure 5:
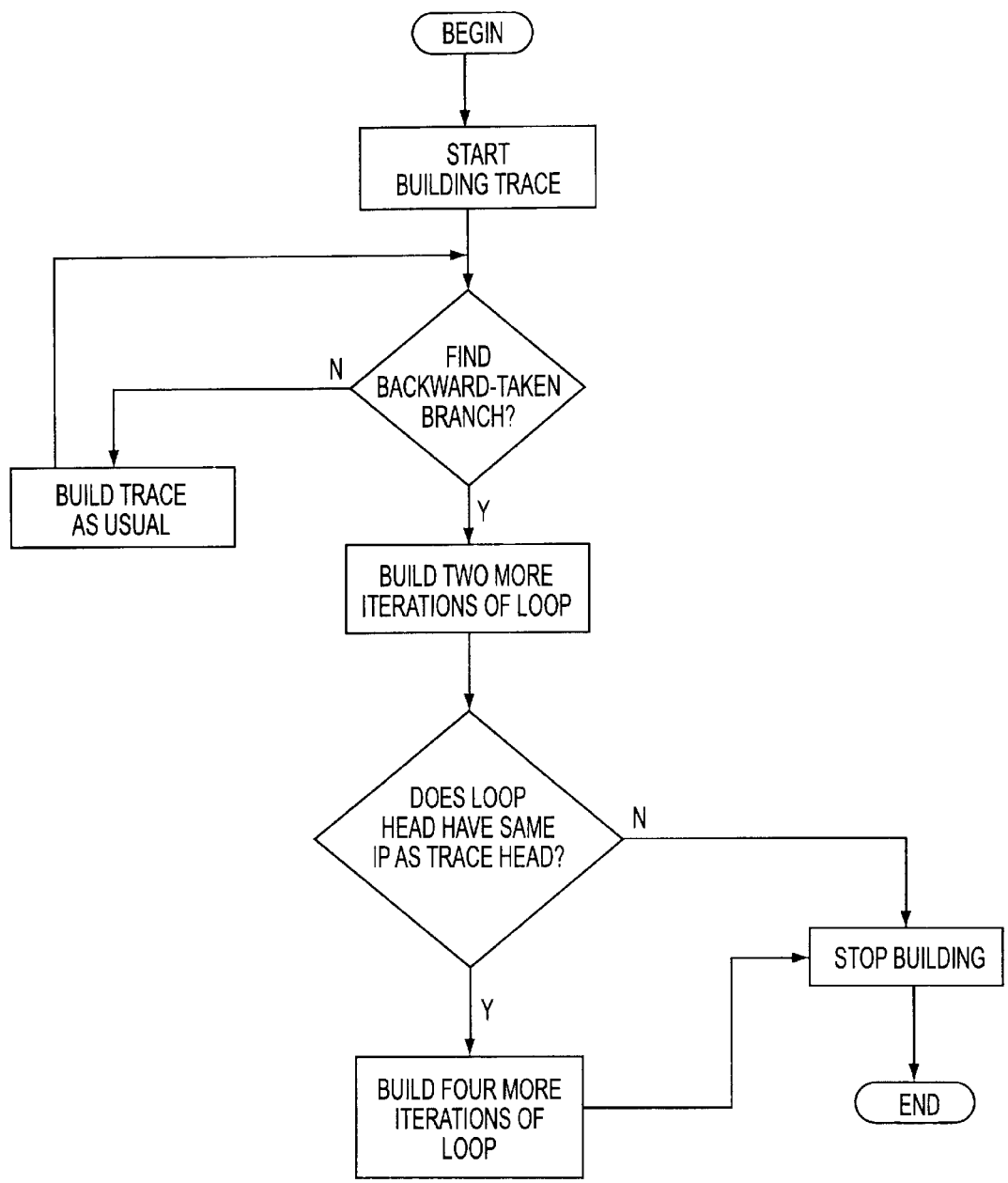
FIG. 5 is a flow chart of a third exemplary embodiment of a method according to the present invention.
Figure 6:
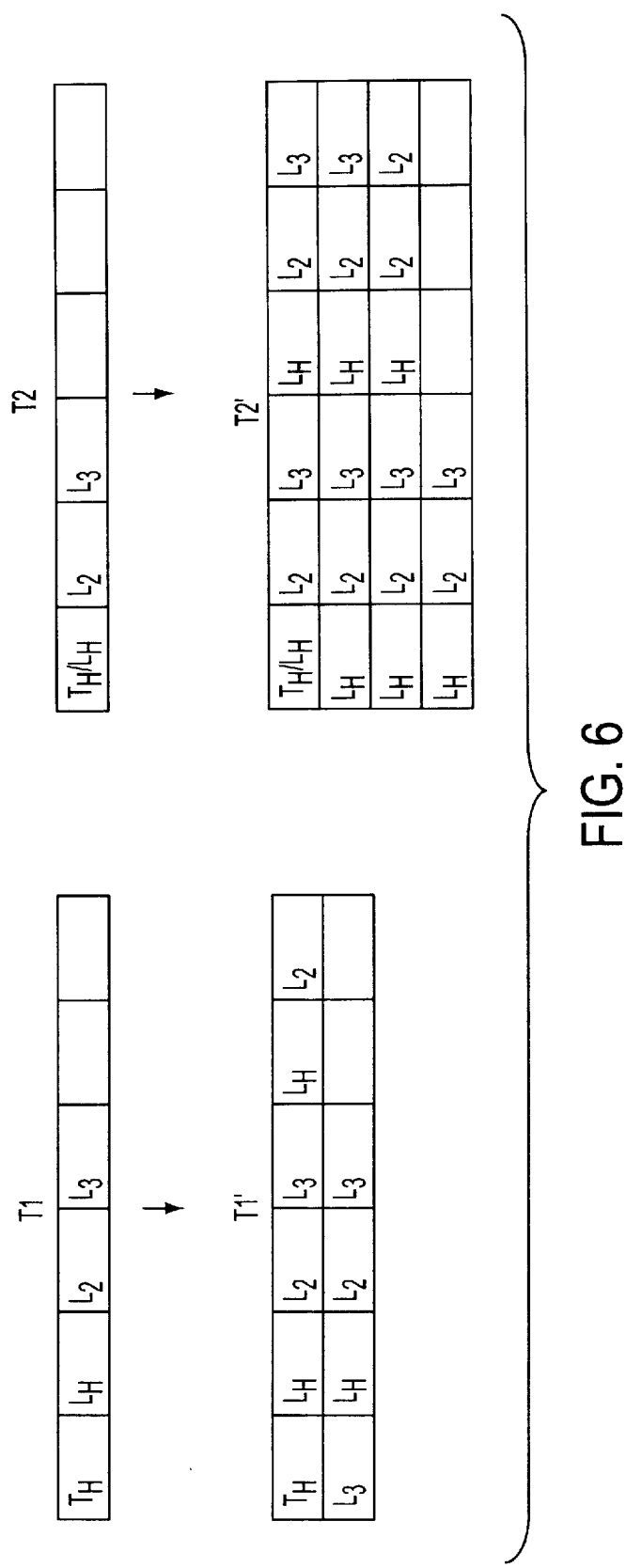
FIG. 6 is a schematic drawing of the application of the method of FIG. 5 to the two exemplary traces.

FIGS. 5 and 6 illustrate a third exemplary embodiment of a method according to the present invention. In this embodiment, a loop may be automatically unrolled a certain number of times or to a certain length, after which a check is performed to determine whether the head of the loop has the same instruction pointer as the trace head of the current trace. If the instruction pointers do not match, then the build process can be stopped at that point. If on the other hand the instruction pointers do match, then additional unrolling may be performed, again, for example, to a specified minimum number of iterations or minimum length. Any suitable length of the initial unrolling as well as any suitable extent of further unrolling may be performed. Moreover, if suitable, a check may be performed that limits or eliminates unrolling for loops greater than a specified length. In the exemplary embodiment of FIGS. 5 and 6, however, any loop is automatically unrolled for two iterations (as shown by trace T1' of FIG. 6), and any additional unrolling takes place until the trace is greater than 18 micro-ops in length (as shown by trace T2' of FIG. 6).

Figure 7:
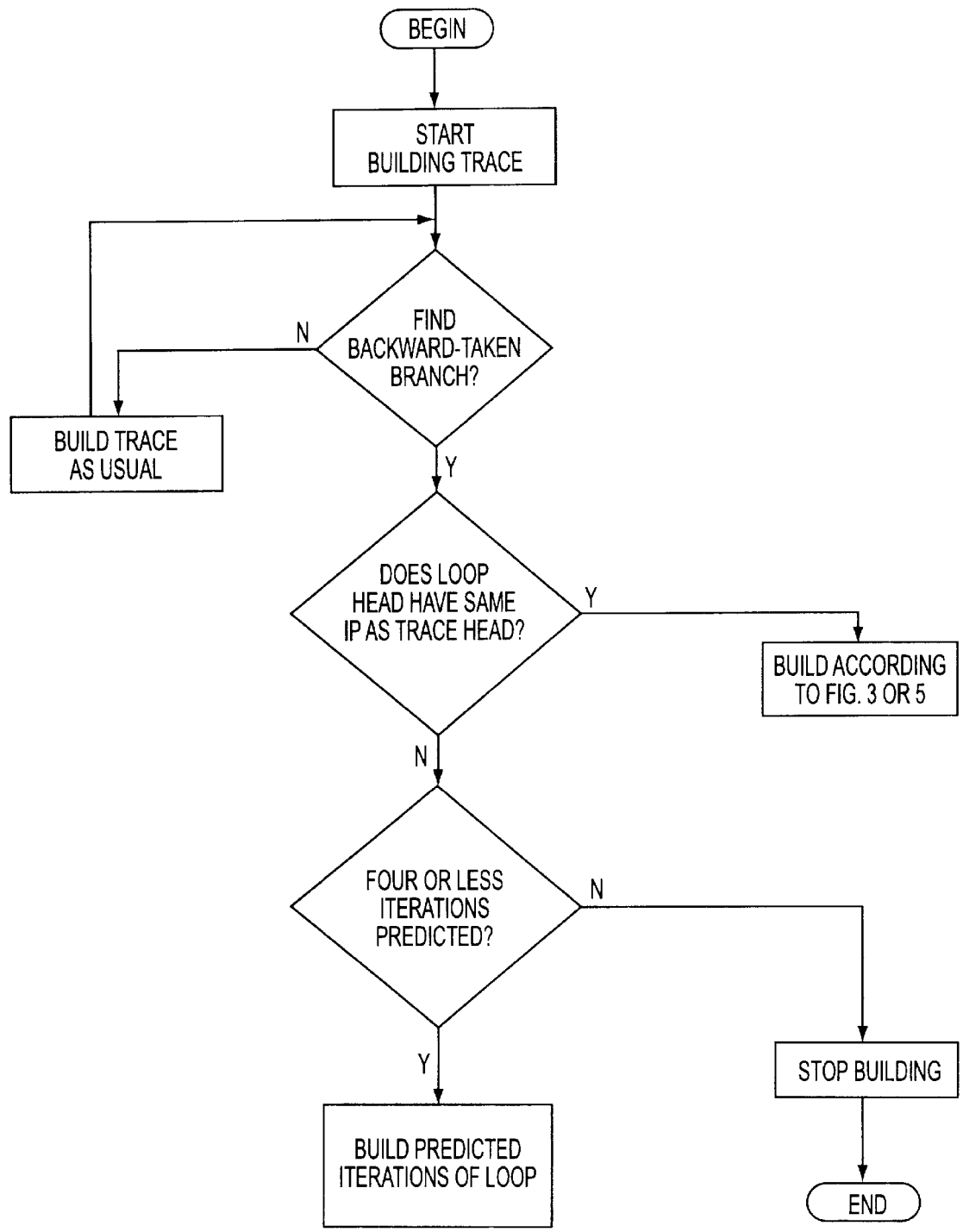
FIG. 7 is a flow chart of a exemplary embodiment of a method according to the present invention.
Figure 8:
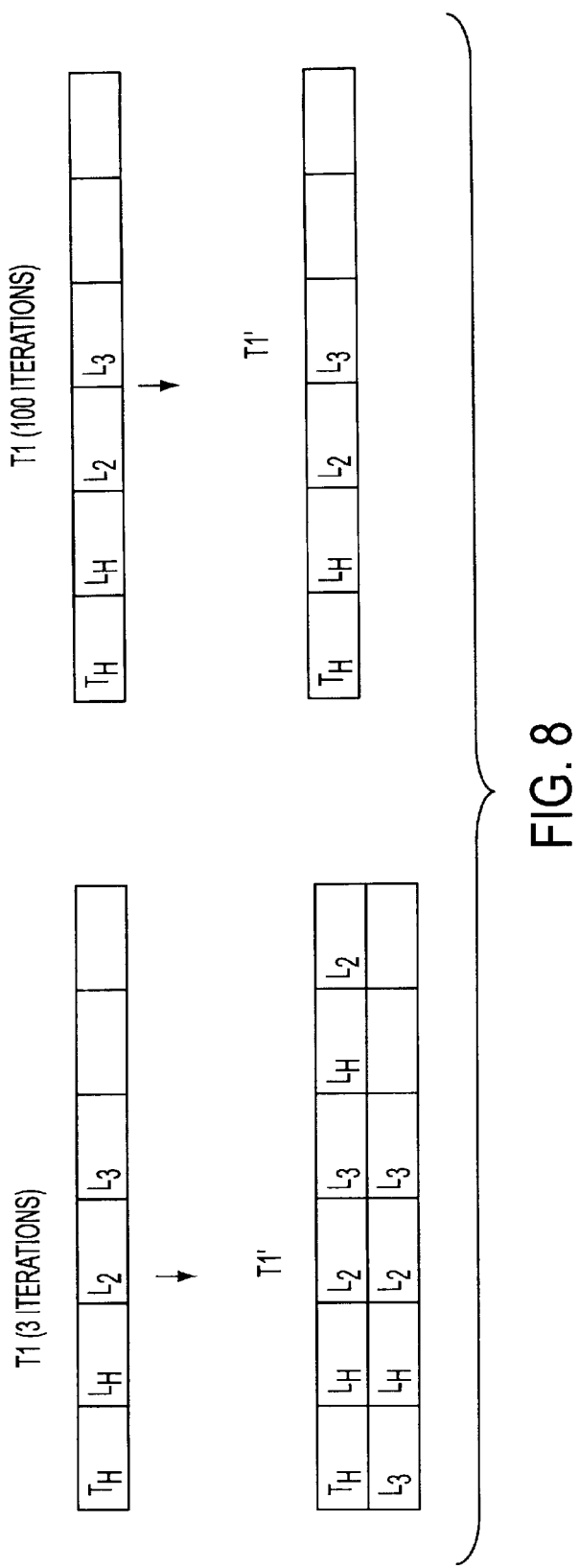
FIG. 8 is a schematic drawing of the application of the method of FIG. 7 to an exemplary trace under two different conditions.

FIGS. 7 and 8 illustrate a fourth exemplary embodiment of a method according to the present invention. In this embodiment, a prediction scheme is utilized to predict an expected number of iterations of the loop. Once the trace cache encounters a backward taken branch while building the trace, it makes or otherwise obtains, for example, a predicted number of iterations of the loop. If the predicted number of iterations is small, the loop may be unrolled the predicted number of times regardless of whether the head of the loop is the same as the head of the trace. If the predicted number of iterations is large, or if the number of micro-ops in a loop is larger than a selected value, either of the two exemplary schemes described above may be applied, another loop unrolling scheme may be applied, or the loop may not be unrolled at all. An exemplary prediction scheme includes reviewing branch history information to determine the number of iterations that were performed during the last execution of the loop. A second exemplary prediction scheme includes reviewing branch history information to determine the average number of iterations that were performed over a number of executions of the loop. Other suitable prediction schemes may also be employed.

FIG. 8 illustrates the application of this exemplary method to the trace T1 under two different circumstances. In the first illustration, the loop of T1 is predicted to undergo three iterations during the next execution, while in the second illustration the loop is predicted to undergo one hundred iterations during the next execution. Accordingly, in the first case the loop is unrolled three times, and in the second case the loop is not unrolled, because, for example, the target of the backward taken branch $L_3$ does not have the same instruction pointer as the trace head $T_H$.

Figure 9:
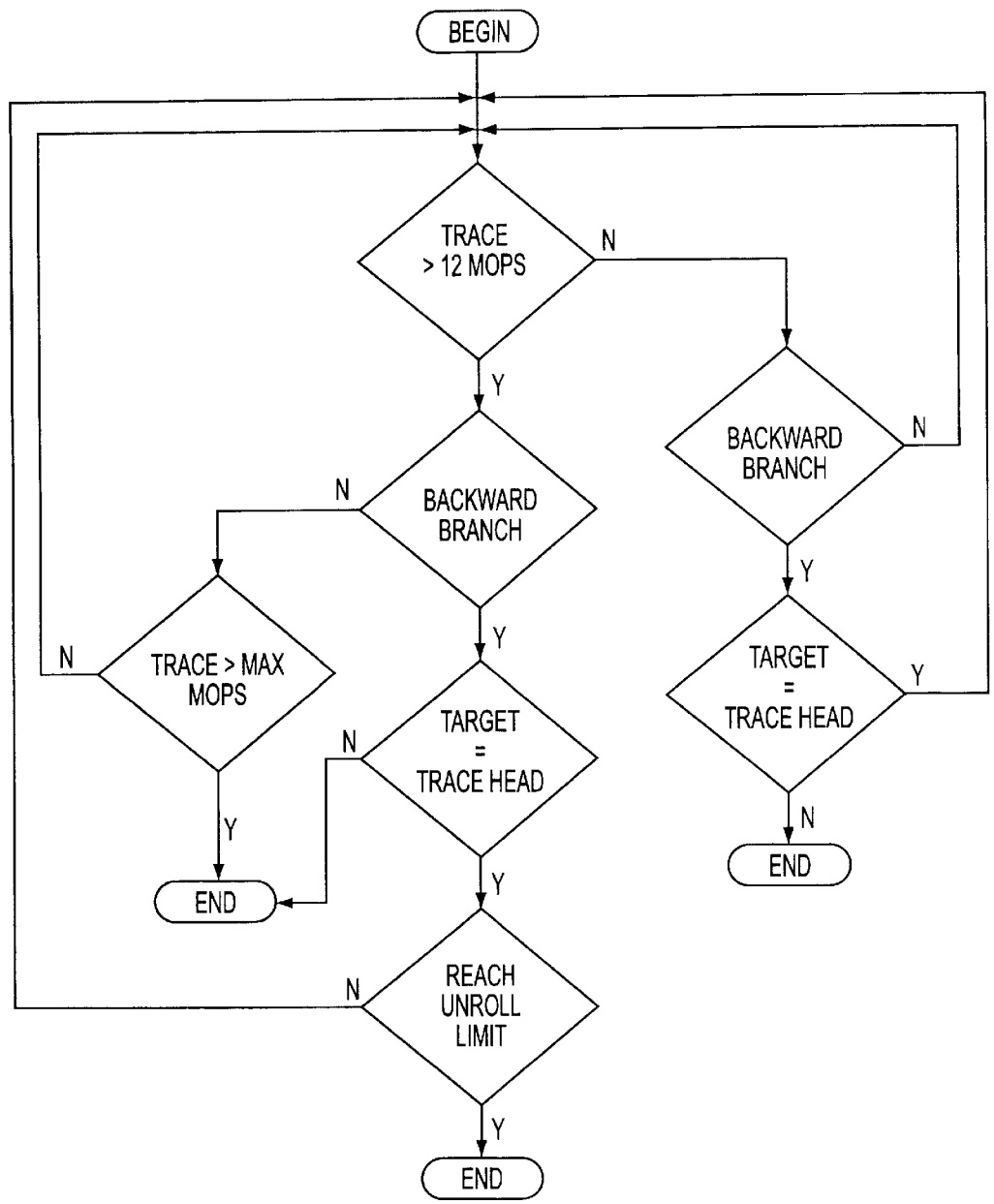
FIG. 9 is a flow chart of a further exemplary embodiment of a method according to the present invention.

FIG. 9 illustrates a further exemplary embodiment in which unrolling is limited by the size of the trace (up to a specified maximum number of micro-ops) or by the number of iterations of a loop. In this embodiment, if the size of the trace is less than a given basic size (for example, twelve micro-ops), then the trace cache builds the trace as described, for example, by unrolling loops where the target of the backward taken branch is the trace head. If the trace is greater than the twelve micro-op basic size, then if a backward taken branch is found, the resulting loop is unrolled only if the target of the backward taken branch is the trace head, and only if an unroll limit has not been reached. The unroll limit may be, for example, a maximum number of micro-ops or a maximum number of loop iterations.

Figure 10:
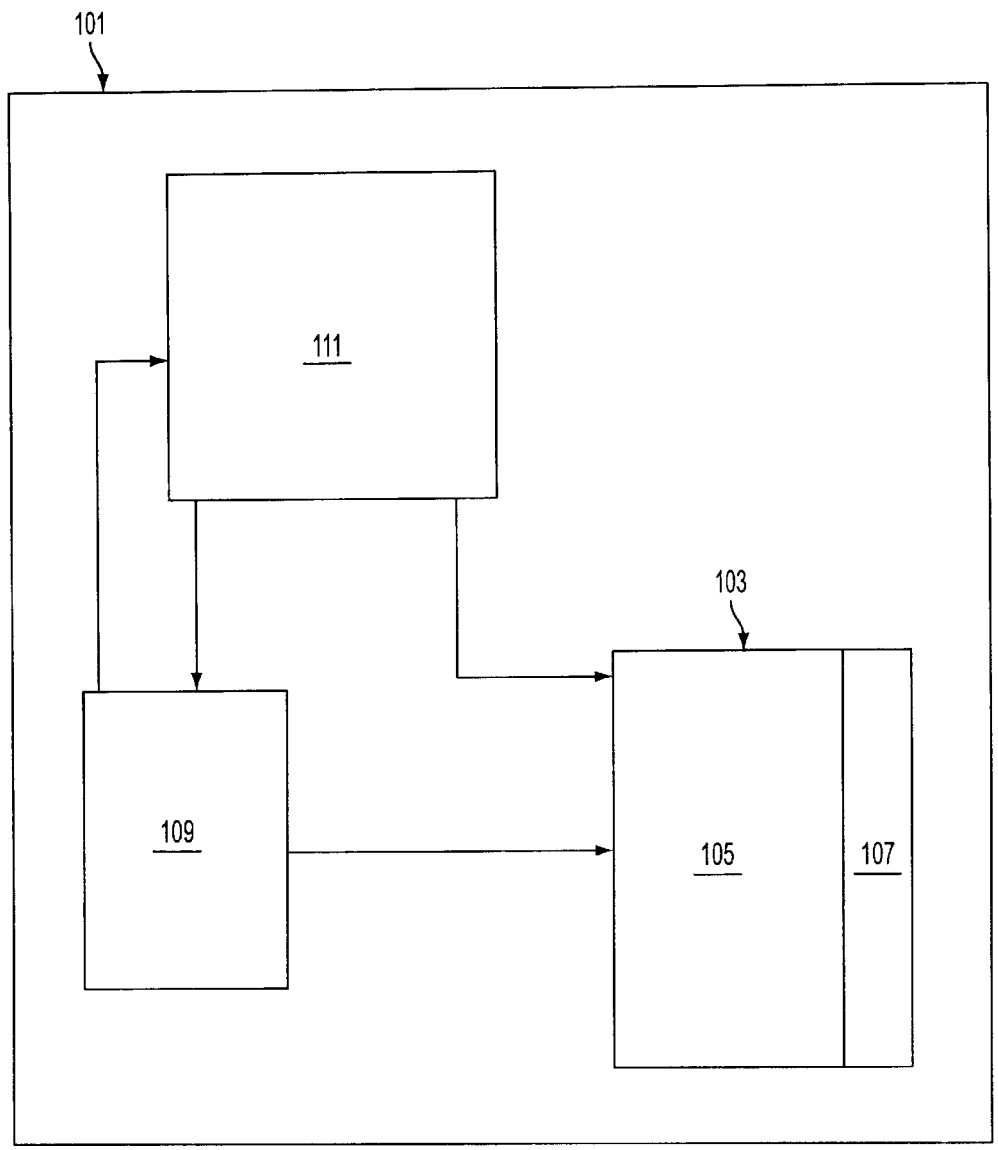
FIG. 10 is a schematic illustration of an exemplary embodiment of a trace cache according to the present invention.

FIG. 10 illustrates an exemplary embodiment of a trace cache 101 according to the present invention. The exemplary trace cache includes a cache unit 103 including, for example, a data array 105 for storing traces and a cache index 107 for storing address information that indexes the contents of the data array 105. The trace cache also includes, for example, a control block 109 and a instruction decoder 111. The control block 109 is responsible, for example, for controlling the build process according to one of the embodiments of the method described above. The instruction decoder 111 reviews a stream of processor instructions, for example, and supplies micro-ops to the data array 105. In this embodiment, the control block 109 facilitates the build process by providing write enable commands to the data array 105 to store the micro-ops provided by the instruction decoder 111.

Figure 11:
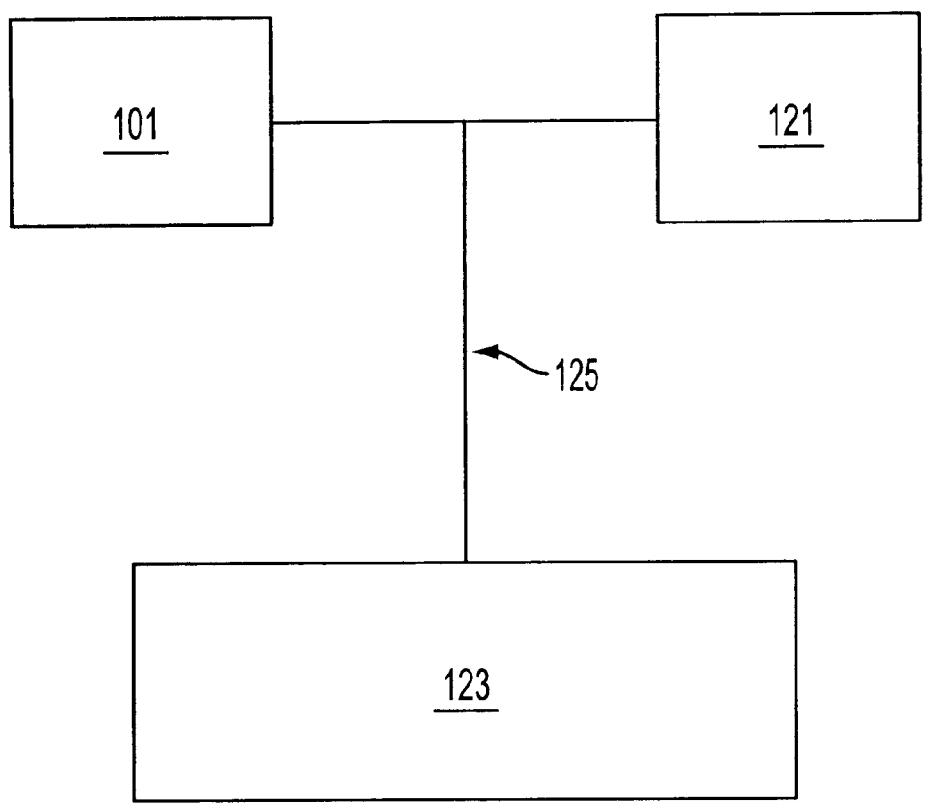
FIG. 11 is a schematic illustration of an exemplary computer system according to the present invention.

FIG. 11 illustrates an exemplary embodiment of computer system according to the present invention. In the illustrated embodiment, the computer system includes a processor 121, a trace cache 101, and a computer memory 123, such as a dynamic random access memory ("DRAM"). These may be connected by a bus 125. While in the illustrated system trace cache 101 and processor 121 appear as distinct elements, trace cache 101 may be included within processor 123. In addition, processor 123 may perform any of the functions described above, when suitable.

The device and method according to the present invention have been described with respect to several exemplary embodiments. It can be understood, however, that there are many other variations of the above-described embodiments which will be apparent to those skilled in the art, even where elements have not explicitly been designated as exemplary. For example, a method of unrolling loops using branch prediction might always unroll the loop the predicted number of iterations regardless of the predicted number of iterations. As a second example, the trace cache itself may store instructions in a form other than micro-ops. Other modifications are possible. It is understood that these modifications are within the teaching of the present invention, which is to be limited only by the claims appended hereto.

What is claimed is:

1. A processor, comprising:
   a cache unit including a data array, the data array that is to store traces; and
   a control block connected to the cache unit, the control block that is to unroll loops to build the traces, wherein the operation to unroll loops includes: determining whether a current trace contains a loop by determining if the current trace contains a backward taken branch and if the current trace contains the loop, building at least one additional copy of the loop.

2. The processor according to claim 1, wherein the operation to unroll loops includes:
   if the current trace contains the loop, obtaining a prediction of an expected number of iterations of the loop; and
   if the expected number of iterations of the loop is less than a maximum number, building a number of additional copies of the loop, wherein the number of additional copies of the loop being the same as the expected number of iterations of the loop.

3. The processor according to claim 1, wherein the operation of building at least one additional copy of the loop includes building additional copies of the loop until a length of the current trace is greater than a minimum length.

4. The processor according to claim 1, wherein the operation to unroll loops includes:
   if the current trace contains the loop, determining whether an instruction pointer of a target of the backward taken branch is the same as an instruction pointer of a trace head; and
   if the instruction pointer of the target is the same as the instruction pointer of the trace head, building at least one additional copy of the loop.

5. The processor according to claim 4, wherein the operation of building at least one additional copy of the loop includes building additional copies of the loop until a length of the current trace is greater than a minimum length.

6. The processor according to claim 1, wherein the operation to unroll loops includes:
   if the current trace contains the loop, building at least one additional copy of the loop;
   if the current trace contains the loop, determining whether an instruction pointer of a target of the backward taken branch is the same as an instruction pointer of a trace head; and
   if the instruction pointer of the target is the same as the instruction pointer of the trace head, building at least one further additional copy of the loop.

7. The processor according to claim 6, wherein the operation of building at least one further additional copy of the loop includes building further additional copies of the loop until a length of the current trace is greater than a minimum length.

8. A method of unrolling loops in a trace cache, comprising:
  determining whether a current trace contains a loop by determining if the current trace contains a backward taken branch;
  if the current trace contains the loop, determining whether an instruction pointer of a target of the backward taken branch is the same as an instruction pointer of a trace head; and
  if the instruction pointer of the target is the same as the instruction pointer of the trace head, building at least one additional copy of the loop.

9. The method according to claim 8, wherein the operation of building at least one additional copy of the loop includes building additional copies of the loop until a length of the current trace is greater than a minimum length.

10. A trace cache, comprising:
  a cache unit including a data array and a cache index, the data array that is to store traces and the cache index that is to store address information indexing the traces; and
  a control block, the control block that is to unroll loops to build the traces, wherein the operation to unroll loops includes: determining whether a current trace contains a loop by determining if the current trace contains a backward taken branch and if the current trace contains the loop, building at least one additional copy of the loop.

11. The trace cache according to claim 10, wherein building at least one additional copy of the loop includes building additional copies of the loop until a length of the current trace is greater than a minimum length.

12. The trace cache according to claim 10, wherein the operation to unroll loops includes:
  if the current trace contains the loop, determining whether an instruction pointer of a target of the backward taken branch is the same as an instruction pointer of a trace head; and
  if the instruction pointer of the target is the same as the instruction pointer of the trace head, building at least one additional copy of the loop.

13. The trace cache according to claim 12, wherein the operation of building at least one additional copy of the loop includes building additional copies of the loop until a length of the current trace is greater than a minimum length.

14. The trace cache according to claim 10, wherein the operation to unroll loops includes:
  if the current trace contains the backward taken branch, building at least one additional copy of the loop;
  if the current trace contains the loop, determining whether an instruction pointer of a target of the backward taken branch is the same as an instruction pointer of a trace head; and
  if the instruction pointer of the target is the same as the instruction pointer of the trace head, building at least one further additional copy of the loop.

15. The trace cache according to claim 14, wherein the operation of building at least one further additional copy of the loop includes building further additional copies of the loop until a length of the current trace is greater than a minimum length.

16. The trace cache according to claim 9, wherein the operation to unroll loops includes:
  if the current trace contains the loop, obtaining a prediction of an expected number of iterations of the loop; and
  if the expected number of iterations of the loop is less than a maximum number, building a number of additional copies of the loop, wherein the number of additional copies of the loop being the same as the expected number of iterations of the loop .

17. A computer system, comprising:
  a processor;
  a cache unit including a data array, the data array to store traces; and
  a control block connected to the cache unit, the control block that is to unroll loops to build the traces, wherein the operation to unroll loops includes: determining whether a current trace contains a loop by determining if the current trace contains a backward taken branch and if the current trace contains the loop, building at least one additional copy of the loop.

18. The computer system according to claim 17, wherein the operation to unroll loops includes:
  if the current trace contains the loop, determining whether an instruction pointer of a target of the backward taken branch is the same as an instruction pointer of a trace head; and
  if the instruction pointer of the target is the same as the instruction pointer of the trace head, building at least one additional copy of the loop.

19. The computer system according to claim 17, wherein the operation to unroll loops includes:
  if the current trace contains the loop, obtaining a prediction of an expected number of iterations of the loop; and
  if the expected number of iterations of the loop is less than a maximum number, building a number of additional copies of the loop, wherein the number of additional copies of the loop being the same as the expected number of iterations of the loop.

20. A method of unrolling loops in a trace cache, comprising:
  determining whether a current trace contains a loop by determining if the current trace contains a backward taken branch;
  if the current trace contains the loop, obtaining a prediction of an expected number of iterations of the loop; and
  if the expected number of iterations of the loop is less than a maximum number, building a number of additional copies of the loop, wherein the number of additional copies of the loop being the same as the expected number of iterations of the loop.

21. The method of claim 20, further comprises:
  if the current trace contains the loop, determining whether an instruction pointer of a target of the backward taken branch is the same as an instruction pointer of a trace head; and
  if the instruction pointer of the target is the same as the instruction pointer of the trace head, building at least one additional copy of the loop.

22. The method of claim 21, wherein the operation of building at least one additional copy of the loop comprises:
  building additional copies of the loop until a length of the current trace is greater than a minimum length.

* * * * *